(12) United States Patent
Sehr

(10) Patent No.: US 7,760,369 B2
(45) Date of Patent: Jul. 20, 2010

(54) APPARATUS AND METHOD FOR DETERMINING AN ELEVATION OF WORKING TOOLS BASED ON A LASER SYSTEM

(75) Inventor: Willibald Sehr, Hadamar/Steinbach (DE)

(73) Assignee: Moba-Mobile Automation AG, Elz (DE)

( * ) Notice: Subject to any disclaimer, the term of this patent is extended or adjusted under 35 U.S.C. 154(b) by 0 days.

(21) Appl. No.: 12/104,277

(22) Filed: Apr. 16, 2008

(65) Prior Publication Data

US 2008/0252907 A1 Oct. 16, 2008

(30) Foreign Application Priority Data

Apr. 16, 2007 (EP) .................................. 07007719

(51) Int. Cl.
*G01B 11/14* (2006.01)
(52) U.S. Cl. ....................................... 356/623; 356/614
(58) Field of Classification Search ................. 356/614, 356/620, 622–623, 3–22, 141.4; 172/430, 172/4.5; 33/293, 294, 296; 342/53, 54, 58; 180/167–168
See application file for complete search history.

(56) References Cited

U.S. PATENT DOCUMENTS

| 3,736,058 | A | * | 5/1973 | Iadarola | 356/4.08 |
| 4,441,809 | A | | 4/1984 | Dudley et al. | |
| 4,820,041 | A | | 4/1989 | Davidson et al. | |
| 5,534,872 | A | * | 7/1996 | Kita | 342/146 |
| 2003/0137658 | A1 | | 7/2003 | Ohtomo et al. | |

FOREIGN PATENT DOCUMENTS

EP 1079029 A2 2/2001

* cited by examiner

*Primary Examiner*—Gregory J Toatley, Jr.
*Assistant Examiner*—Tri T Ton
(74) *Attorney, Agent, or Firm*—Michael A. Glenn; Glenn Patent Group

(57) ABSTRACT

An apparatus for determining an elevation of a working tool relative to a reference plane, includes a rotary laser system, a radio unit and a detector. The rotary laser system emits a rotating laser beam in a plane inclined relative to the reference plane. The radio unit is configured to measure a distance between the working tool and the rotary laser system and the detector is mounted on the working tool for detecting the laser beam. The elevation of the working tool can be determined on a basis of the inclination angle and the distance between the working tool and the rotary laser system.

22 Claims, 11 Drawing Sheets

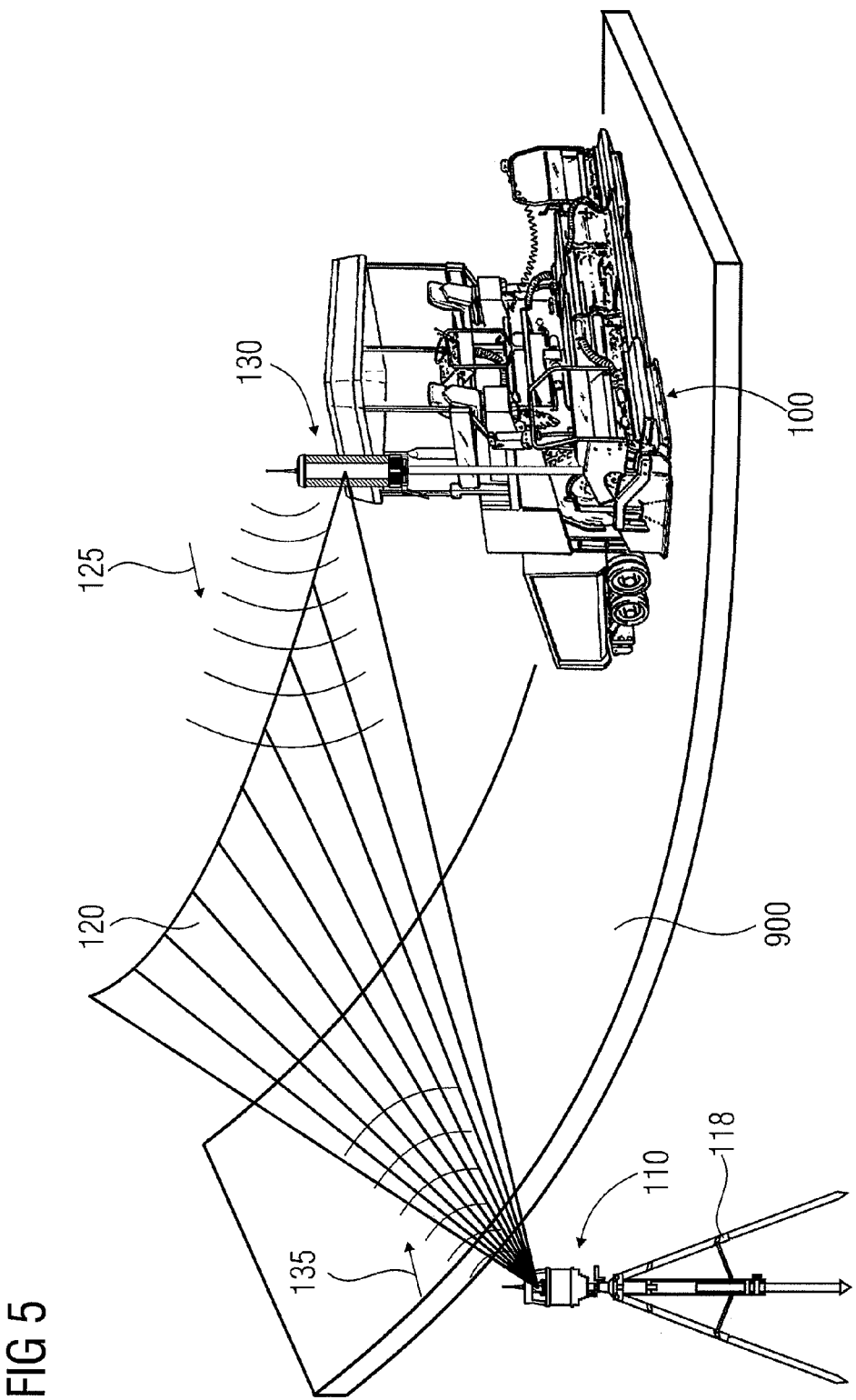

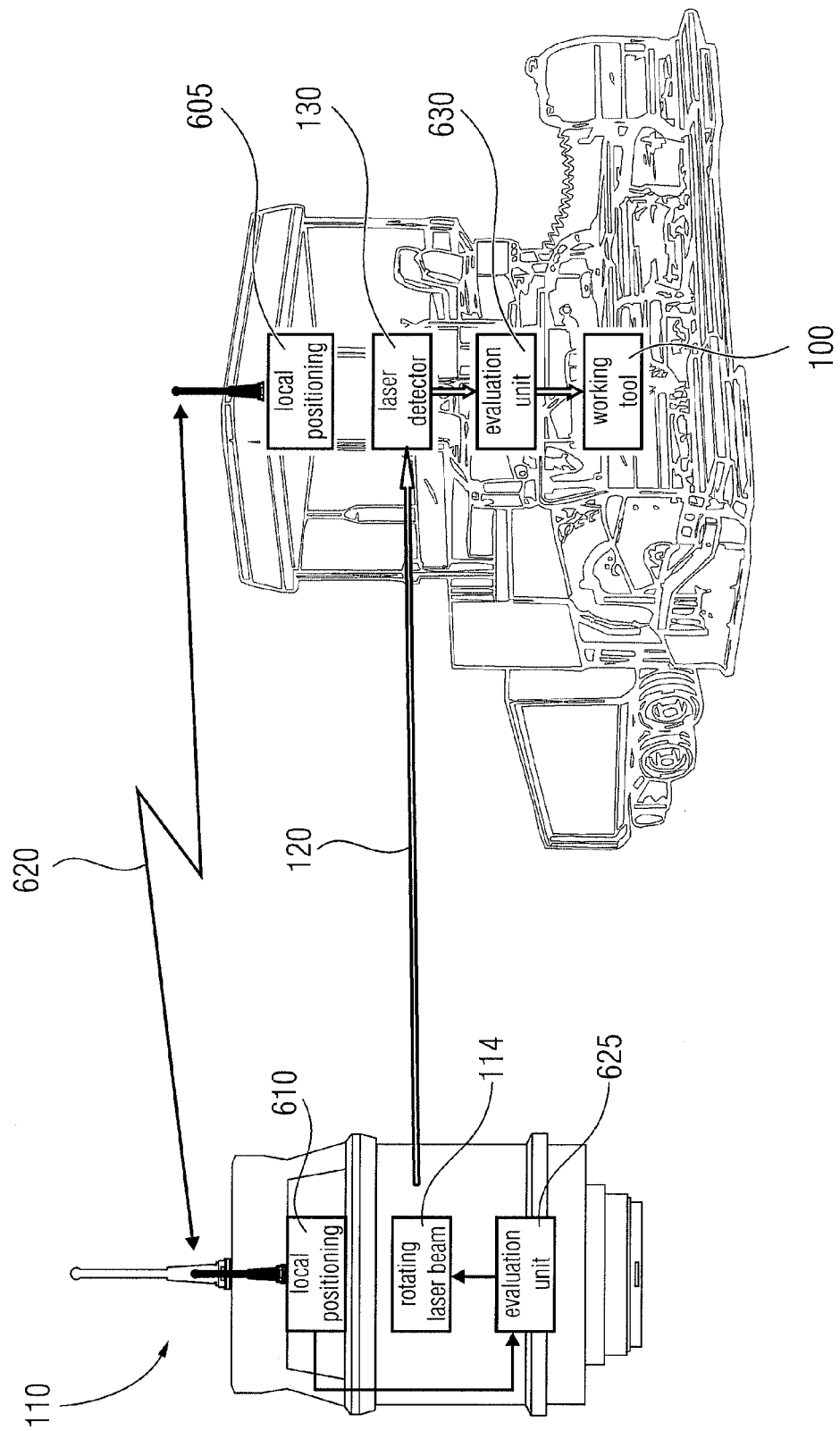

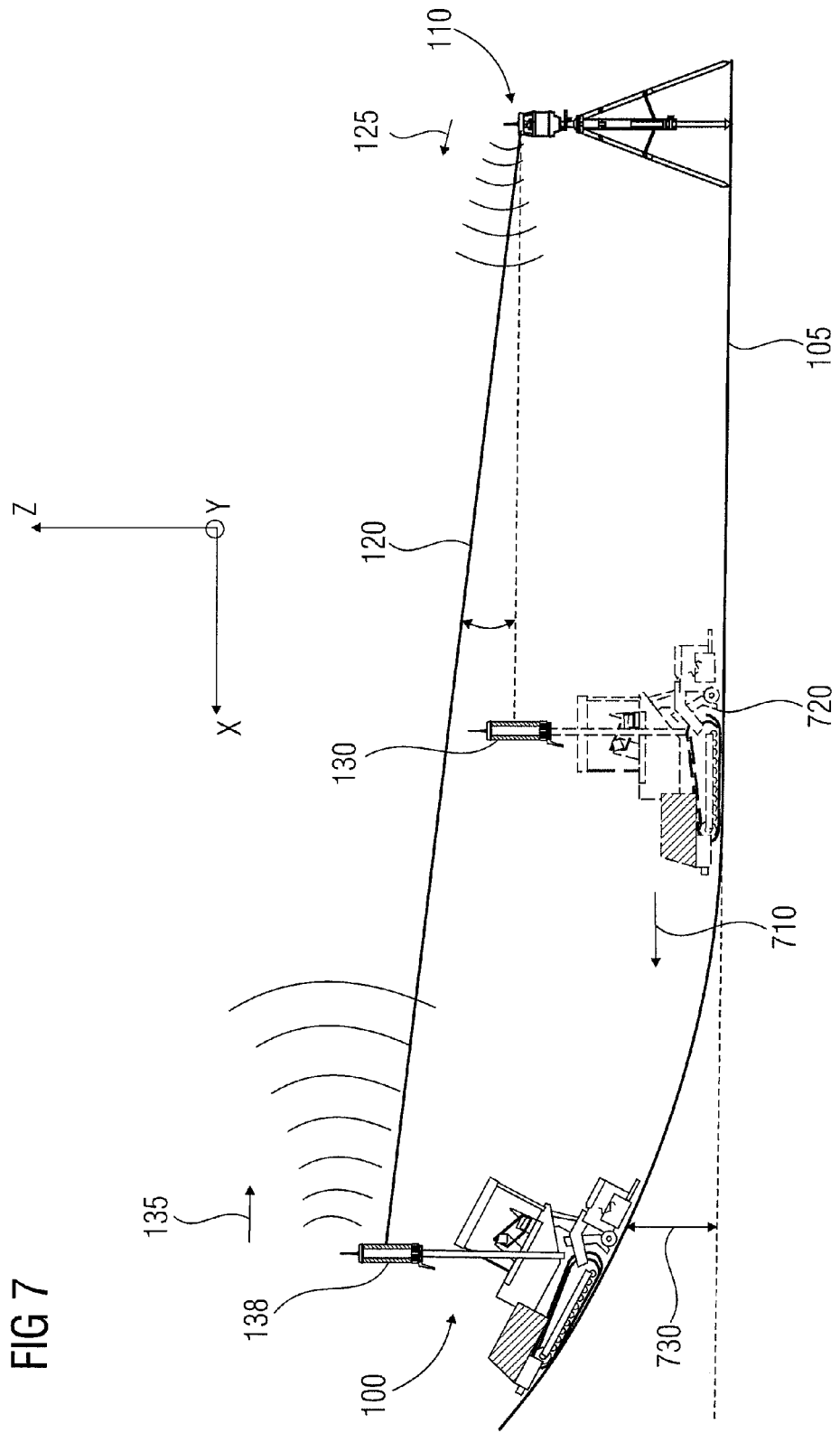

APPARATUS AND METHOD FOR DETERMINING AN ELEVATION OF WORKING TOOLS BASED ON A LASER SYSTEM

CROSS-REFERENCE TO RELATED APPLICATIONS

This application claims priority from European Patent Application No. 07007719.3, which was filed on Apr. 16, 2007, and is incorporated herein in its entirety by reference.

TECHNICAL FIELD

The present invention relates to an apparatus and a method for determining an elevation of a working tool with respect to a reference plane.

BACKGROUND

In order to direct a construction machine or more generally a working tool on a construction site, there is a need for determining not only a position of the construction machine along horizontal directions, but also to obtain and control a vertical elevation. There are different methods available for surveying a ground profile and to direct working tools or construction machines accordingly. For example, a system to measure the absolute position can be set up on the basis of GPS (GPS=Global Positioning System). A different system measures local or relative positions with respect to a reference point and uses for example so-called total stations or laser transmitters. Also combinations of both systems are known.

Moreover, simple measuring tools are available that use an existing ground profile as a basis on which a new ground profile is developed.

GPS-based positioning systems, e.g. hand-held or mounted systems, are generally known. To achieve an increased position accuracy different approaches are possible. For example, a reference station or RTK evaluation (RTK=Real Time Kinematics) can be used, and depending on effort and resources position accuracy in a centimeter range is possible.

In systems using the total station, a robot guided measuring station follows a prism mounted on a movable part and transmits the evaluated coordinates to a recipient, that evaluates on the basis of this data a local position of the prism within the construction site. The effort is significant and in systems using the total station only one prism can be followed at a given time, which is disadvantageous although the position accuracy reaches already a sub-centimeter range.

Laser-based systems are used in cases where the knowledge about the elevation above a horizontal or reference plane is more important than the exact position within the horizontal plane. This is, for example, the case for construction at a known position or for underground construction of buildings or drainage.

Conventional laser systems are described in U.S. Pat. No. 4,441,809, in which at least two fan-shaped laser beams are transmitted (for example, having a cross section of a V or an X) so that at each revolution two signals are generated at each detector. A radio unit is used to provide a strobe signal. A further laser system is described in US 2003/0137658, which has no radio unit but uses instead a GPS receiver. The disclosure employs also at least two fan-shaped laser beams.

Also combined GPS- and laser-based systems are known. The GPS signal is used as a coarse elevation information. The laser system transmits fan-shaped laser beams (as a Z-shaped laser beam, for example) and is used to improve significantly the vertical accuracy or resolution, i.e. the information about the elevation along a z-axis. This method is known as millimeter-GPS and combines the advantage of high precision measurement with the possibility of using the system simultaneously by various participants. It is, however, technically very costly.

SUMMARY

According to an embodiment, an apparatus for determining an elevation of a working tool relative to a reference plane may have: a rotary laser system emitting a rotating laser beam that spans upon rotation a plane inclined relative to the reference plane by an inclination angle; a detector mounted on the working tool for detecting the laser beam, wherein: a radio unit configured to measure a distance between the working tool and the rotary laser system using an elapsed time between a transmitted and a returned radio signal, wherein the apparatus is adapted to determine the elevation of the working tool on a basis of the inclination angle $\alpha$ and the distance between the working tool and the rotary laser system.

According to another embodiment, a method for determining an elevation of a working tool to a reference plane may have the steps of: emitting a rotating laser beam that spans upon rotation a plane, the plane being inclined by an inclination angle with respect to the reference plane, wherein there further is: measuring a distance between the rotary laser system and the detector on the working tool using an elapsed time between a transmitted and a returned radio signal of a radio unit, wherein the elevation of the working tool is evaluated on a basis of the inclination angle and of the measured distance.

In accordance with embodiments of the present invention, an apparatus for determining an elevation of a working tool relative to a reference plane comprises a rotary laser system emitting a rotating laser beam in a plane, which comprises an inclination angle with the reference plane, a radio unit configured to measure a distance between the working tool and the rotary laser system and a detector mounted on the working tool for detecting the laser beam. The elevation of the working tool is determined on a basis of the inclination angle and the distance between the working tool and the rotary laser system.

In accordance with embodiments of the present invention, a method for determining an elevation of a working tool relative to a reference plane comprises emitting a rotating laser beam from a rotary laser system, wherein the rotating laser beam spans a plane inclined with respect to the reference plane. Based on the corresponding inclination angle and a measurement of a distance between the rotary laser system and the detector on the working tool, the elevation of the working tool is evaluated.

Conventional laser transmitters operate such that a rotating mirror reflects by 90° a point-like vertical aligned laser beam. As a consequence, a horizontal light plane can be generated, which exhibits a small convergence and reaches a radius of approximately 300 meters. Since the whole unit can be arranged on an internal self-leveling platform, a stable optical reference can be obtained and detected by a vertical array of photo diodes.

Embodiments of the present invention combine the aforementioned rotary laser system and the radio-based distance measurement module resulting in a radio based laser-positioning system and possible operating principles can be summarized as follows.

The laser system according to embodiments of the present invention extends the aforementioned laser-based system in a way that, instead of a point-like laser beam, a rotating laser beam is generated and that by employing internal adjustment elements the plane of the rotating laser beam can be inclined with respect to two perpendicular axes in a (x,y)-plane from which the elevation is measured. This adjustment can be done dynamically by using a radio signal, wherein dynamically refers to the possibility that the inclination angle can be changed online, that means without turning off the laser beam followed by a change of the inclination angle and subsequently turning on the laser beam again. In contrast to convention laser systems, which interrupt the emission of light during an adjustment of the inclination angle, the laser system according to the present invention is able to change the inclination angle of the beam plane without interrupting the laser beam.

Codable distance measurement modules rely for example on radio signals (e.g. using 5.8 GHz) and are known as LPR-B (LPR=Local Positioning Radar). A black box transmits a radio signal and another apparatus, located at a specific distance (with an approximate maximum of 1000 meters) receives the signal and returns a coded signal. The original transmitter receives the returned information and evaluates from a time delay between transmitting the signal and receiving the return signal the distance to the apparatus. A conceivable accuracy is within or even below the centimeter range. With this method it is possible to measure by simple means distances between the rotary laser system and the detector. The detector can be mobile or stationary.

Typically, a rotary laser system rotates with 10 . . . 20 revolutions per second. The detector at the machine (working tool) and a hand held detector are built in a similar way. The detector at the machine, however, can comprise a signal-processing unit on a CAN-bus in order to be able to change appropriately controlling and steering elements of the working tool.

Hence, embodiments of the present invention comprise, for example, the following components:
- a laser transmitter for a laser system with a convention leveling platform and a dynamical inclination changing tool, which are combined with a radio based distance measurement module;
- a hand held laser detecting tool comprising moreover a radio module and an optional evaluation tool with a display;
- a stationary detector or a machine based detector with a radio module, which can comprise an evaluation tool and a CAN-bus interface.

The laser transmitter as well as the detector comprises additional radio units or modules for a distance measurement. In case the detector detects a laser pulse from the laser transmitter, a distance measurement can be initiated by using the radio modules. The distance measurement uses an elapsed time between a transmitted and returned radio signal so that after the elapsed time the result of the distance measurement is available. Together with the evaluated elevation angle, the elevation can be evaluated and displayed.

The rotary laser system can be set up at a boundary of a construction site and generates by the rotating laser beam an optical reference plane, which can be inclined with respect to two axis in the (x,y)-plane. This can be done, for example, by inclining the mirror, which reflects the laser beam to generate the rotating laser beam. In case the laser beam hits the detector, which is placed, for example, on the working tool on the construction site, a distance measurement can be initiated by the detector by using an integrated module.

A computer can calculate an actual elevation of the detector over the reference plane by using information about the inclination angle and the distance between the detector and the rotary laser system. If the detector is mounted on the working tool, the elevation of the working tool can be calculated as well. For a known relative position of the detector (in comparison to the rotary laser system) it is possible, by means of a model for the area or construction site to change the inclination angle of the laser system in a way, that the detector can detect possible deviations from a target value and to adjust, for example, by a hydraulics of the working tool the elevation of the working tool to the target value. This is, for example, possible if the detector comprises a row of photocells, which are configured to detect the laser beam in different elevations, so that it becomes sensible for the deviations from the target value. The laser system in turn can transmit the information about the inclination angle to the working tool by using a radio module, which used for the distance measurement, or using a further radio based module.

This information alone, however, is not enough to fix uniquely the position of the working tool or the detector. So far, only two (elevation and distance) of three coordinates are fixed and the therefore the relative position of the detector to the rotary laser system is not yet known. To get all three coordinates, a further measurement of a quantity should be performed, which allows the evaluation of the third coordinate. According to embodiments of the present invention, this can be done by using a time measurement or by means of the hand-held detector. Therefore, the rotary laser system can be synchronized in two different ways, so that arbitrary elevation profiles can be generated on an area.

One possibility is the so-called internal synchronization. In this case, the laser system can be aligned, so that an edge of the of the rotary laser system is parallel to a corner line of a given project (for example, a site line of a sport field or construction site) so that, in a moment of passing of a zero reference mark (e.g. the edge of the rotary laser system) during each revolution a distance measurement can be initiated. The corresponding pulse initiates in a stationary detector (for example, the detector mounted on the working tool) a measurement of time period until the laser signal is detected by the stationary detector. If the rotational velocity $\omega$ of the rotating laser beam is known, the angle $\phi$ between the edge of the project and the receiver or detector can be evaluated. If the rotary laser system rotates, for example, with a rotational velocity of 10 revolutions per second, each revolution takes 100 milliseconds. The rotary laser system can initiate in the moment the laser beam is parallel to the edge, i.e. at an angle of 0°, a distance measurement and the detector starts a timer. If the laser beam hits the detector, the timer can be stopped. The elapsed time is now a direct measure for the angle, for example, a time period of 25 milliseconds gives an angle of 90° for the case that the rotary laser system rotates by 10 revolutions per seconds.

A second possibility corresponds to an external synchronization. In this case, a further detector can be put on a corner of the area after surveying the working area and hence is not needed anymore. In this case, the line between the rotary laser system and the further detector can be taken as reference mark. In the moment the laser beam is detected by the further detector, a radio signal can be transmitted and a distance measurement can be performed. The stationary detector synchronizes itself on the radio signal and starts a time measurement (e.g. a time starts).

By using the information about the elapsed time between the synchronization starting time and the moment the laser beam is detected, the angle in the (x,y)-plane between the reference mark, the rotary laser system and the stationary detector can be calculated. Hence, together with the distance measurement between the stationary detector and the rotary laser system the relative position in (x,y)-plane and elevation is known. The time synchronization is not needed for the case, where the reference plane is planar and there is no need for a position-dependent elevation control (e.g. for a sport field). In this case there is only a need to direct the elevation of the working tool for all positions in the (x,y)-plane in the same way.

A further possibility to evaluate the coordinates x and y of the stationary detector is to put the further detector at another fixed point and at the synchronization time, three distance measurements can be initiated: a distance measurement between the rotary laser system and the stationary detector, a distance measurement between the further detector and the stationary detector and also a distance measurement between the rotary laser system to the further detector for the calculation of the position. The radio measured distances can then be used to determine the coordinates x and y by using the usual trigonometric equations.

In case information for the target coordinates (e.g. as a digital area model) of the to-be shaped area are available, the information can be processed stationary at the rotary laser system and/or at the working tool (machine). This may be possible, because information about the position (e.g. about the coordinates, angles, etc.) can be exchanged via a radio signal.

Embodiments are advantageous in that an improved reliability can be provided, because neither a GPS signal nor a strobe pulse for synchronization are necessitated. The technology is simple, reliable and available at low cost. Especially radio transponders are very fast and accurate. In addition, only one laser transmitter is needed and an optional hand-held detector can be used to survey the working area and/or to define together with the laser transmitter a reference line. It is furthermore beneficial that the present invention allows combining the elevation control with a local (relative) position control in the reference plane.

BRIEF DESCRIPTION OF THE DRAWINGS

Embodiments of the present invention will be detailed subsequently referring to the appended drawings, in which:

FIG. 5 shows a working tool on a construction site with the stationary detector and the rotary laser system;

FIG. 6 shows schematically a processing algorithm for an elevation adjustment of the working tool;

FIG. 7 shows an example for a dynamic inclination adjustment of the rotary laser system;

DETAILED DESCRIPTION

Figure 1:
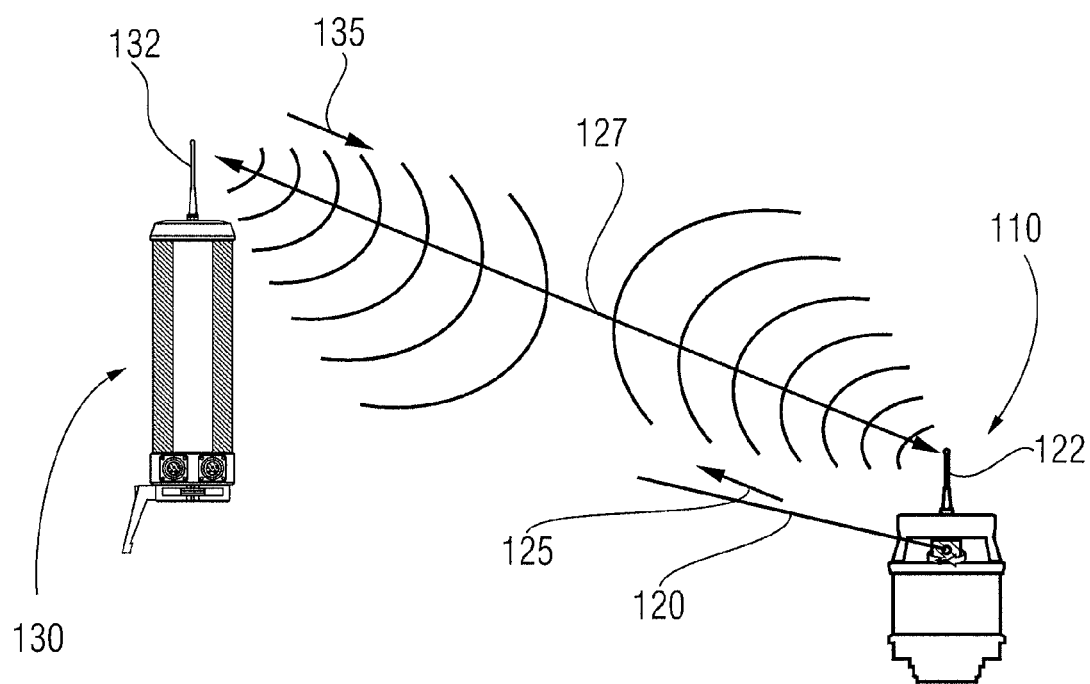
FIG. 1 shows a rotary laser system and a stationary detector with a radio unit according to embodiments of the present invention.

FIG. 1 shows an embodiment of the present invention comprising a rotary laser system 110 transmitting a rotating laser beam 120, the rotary laser system 110 is separated by a distance 127 from a stationary detector 130. Upon rotation the rotating laser beam 120 spans a reference plane 105. The rotary laser system 110 comprises a radio unit (not shown in the figure) connected to a radio antenna 122 and the stationary detector 130 comprises another radio unit (not shown in the figure) connected to a radio antenna 132.

The stationary detector 130 will detect a pulse if it is hit by the rotating laser beam 120. When the pulse is detected a distance measurement can be initiated in way that the stationary detector 130 transmits a radio signal 135 and the rotary laser system 110 responds after receiving the radio signal 135 with a radio signal 125. The stationary detector 130 can measure an elapsed time between transmission of the signal 135 and the reception of the return radio signal 125 and determines the distance 127 on the basis of the elapsed time. The return radio signal 125 can be different from the transmitted signal 135 and can comprise a code that identifies the rotary laser system 110. This can be advantageous in that misinterpretations are avoided in cases in which plural radio units operate on the working area. The rotary laser system 110 can comprise a radio-transponder.

In a different embodiment the time at which the distance measurement is initiated can vary. For example, if more laser systems are used on the working area, by using different angular velocities it is possible to trigger each detector on its own laser system and hence a distance measurement can be initiated only if the time delay between two subsequent hits of the laser beam is within an expected time range.

Figure 2:
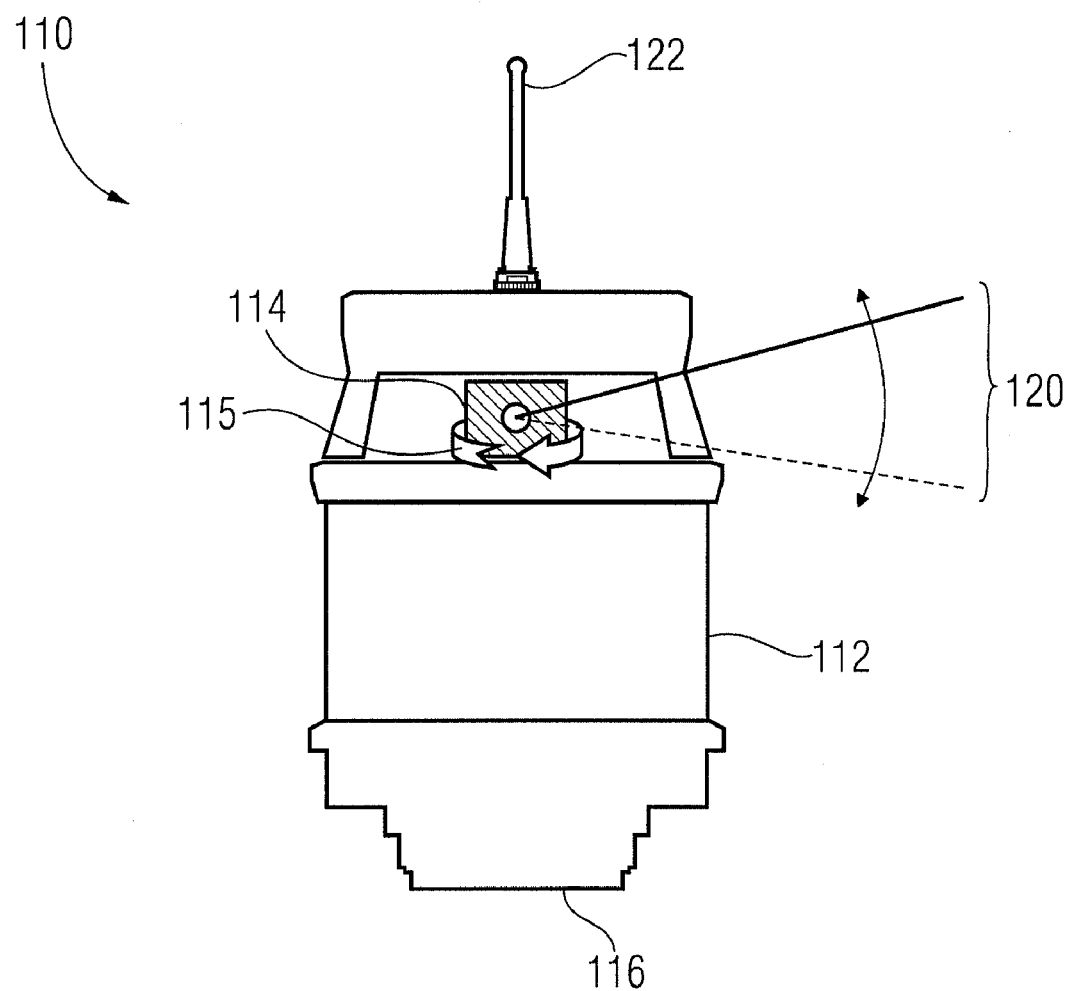
FIG. 2 shows the rotary laser system emitting a laser beam with an adjustable inclination angle.

FIG. 2 shows the rotary laser system 110 comprising an enclosure 112, a rotating optical output 114 for the rotating laser beam 120 and the radio antenna 122 connected to the radio unit (not shown in the figure). The optical output 114 for the laser beam 120 rotates in an embodiment with a constant angular velocity as indicated by the arrow 115. Upon rotation the rotating laser beam 120 defines a plane, which can be inclined by an angle α by means of the rotating optic 114. The rotary laser system 110 comprises moreover a holder 116 used for mounting the rotary laser system 110 on a platform at a fixed position.

Figure 3:
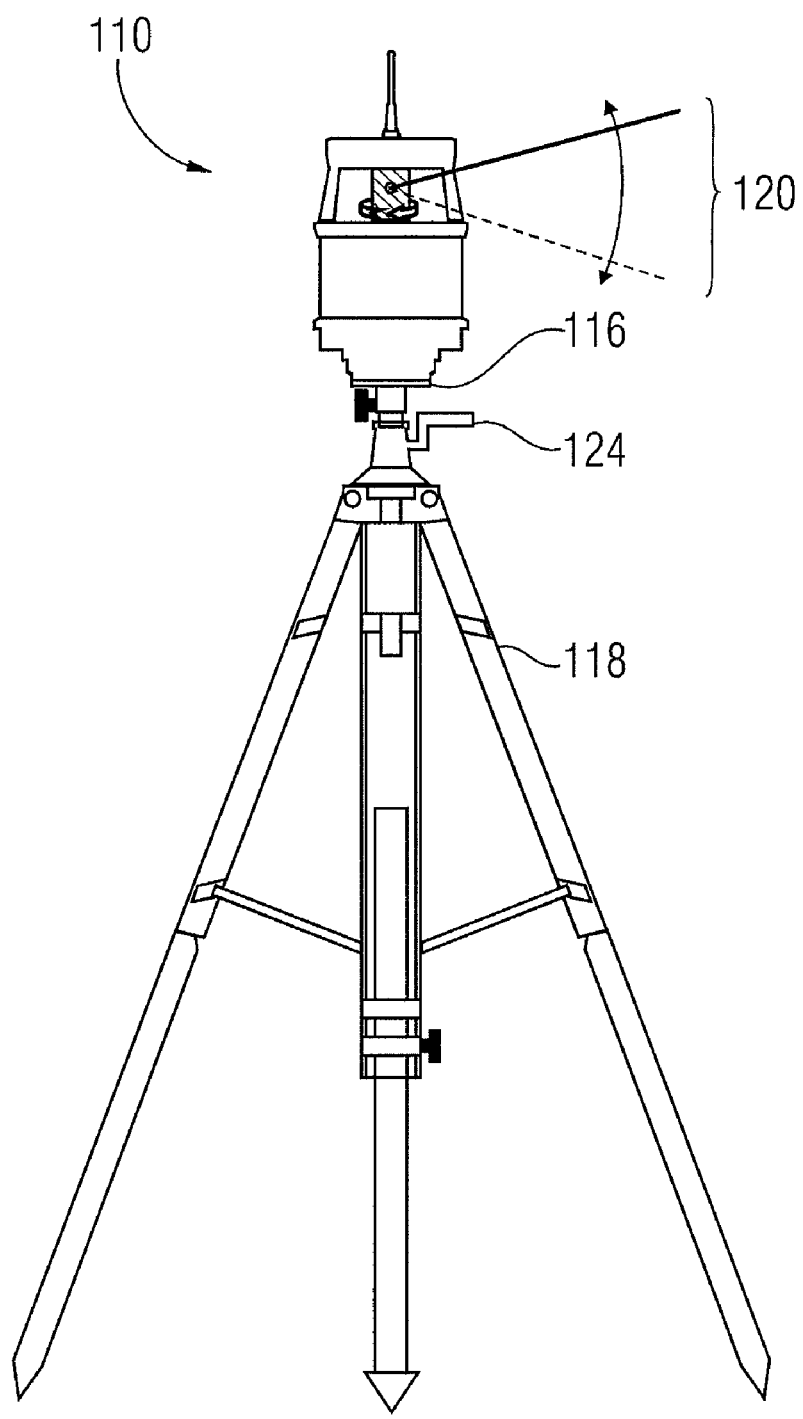
FIG. 3 shows the rotary laser system mounted on a level platform.

FIG. 3 shows the rotary laser system 110 mounted with the holder 116 on a tripod 118. The tripod 118 can be used to level the rotary laser system 110 and comprises a height adjustment 124 used for fine adjustment of the elevation of the rotary laser system 110. The reference plane 105, above which the elevation should be determined, can be assigned to a specific inclination angle, e.g. α=0, of the laser beam 120.

Figure 4:
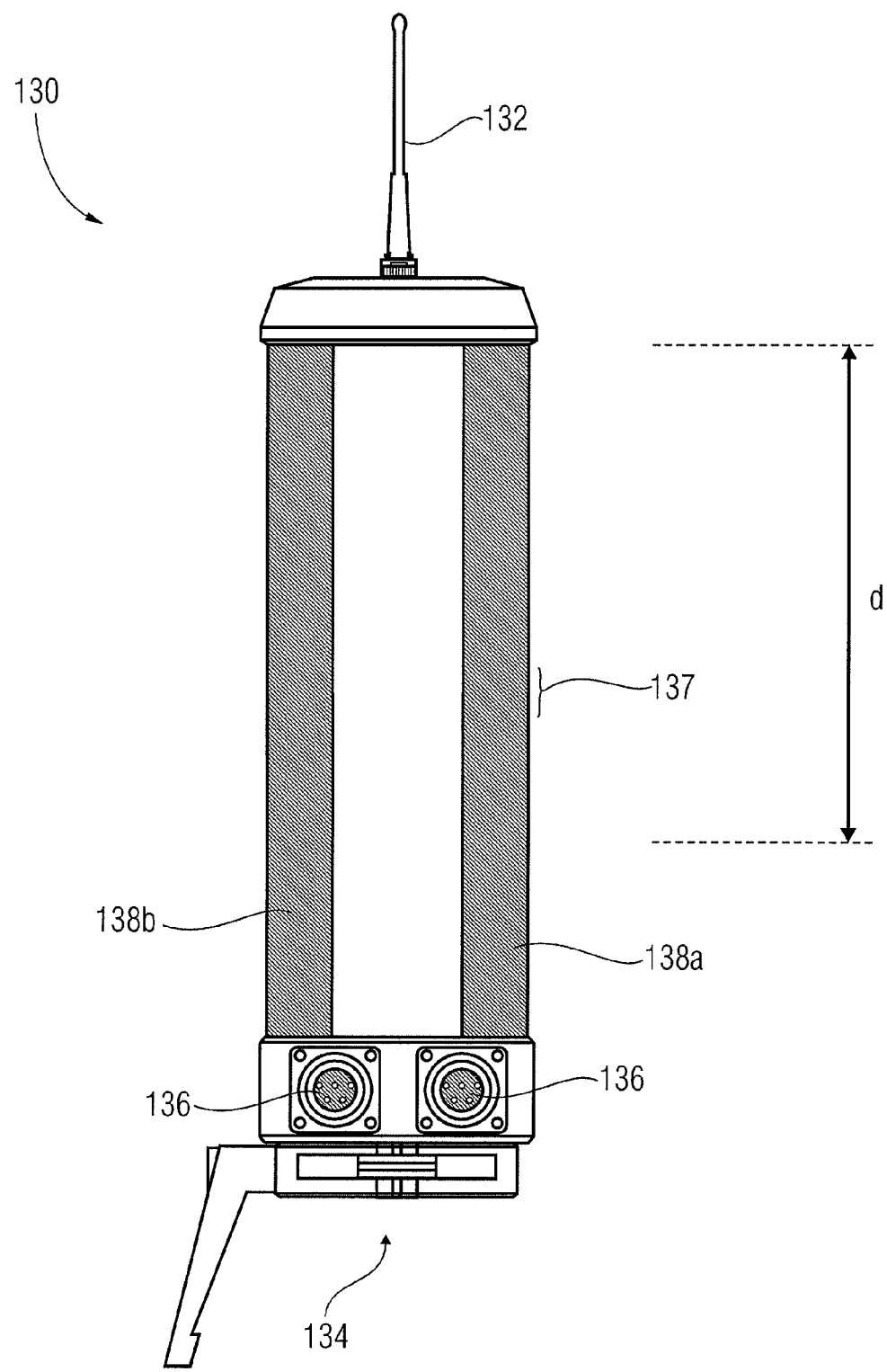
FIG. 4 shows the stationary detector.

FIG. 4 shows the stationary detector 130 with the radio antenna 132 connected to a radio unit (not shown in the figure), a mounting table 134, a CAN-connection 136 (CAN=Controller Area Network) and rows of photocells 138a, 138b. The rows of photocells 138a, 138b extend along the vertical direction (along which the elevation is to be measured) over a length d and comprise a series of photocells. FIG. 4 shows two rows of photocells, but the stationary detector 130 may also comprise further rows of photocells, e.g. three rows arranged around the stationary detector with an angle of 120° between two of them. The number of rows depends on a given application. If, for example, the stationary detector 130 is during operation in a position to detect the laser beam, a single row of photocells 138 may be sufficient.

The mounting table 134 can be used to mount the stationary detector 130 at the working tool 100 at a defined position. For example, the working tool 100 can be a construction machine used to level a ground profile of the construction site, this defined position should have a defined height over the ground in order to translate the elevation of the stationary detector 130 over the reference plane 105 into an elevation of the ground with respect to the reference plane 105. The CAN-connection 136 can be used to connect the stationary detector 130 to a processing unit, which performs the evaluations from the data, or to a display if the stationary detector 130 performs the evaluation of the elevation.

FIG. 5 shows a schematic view of a working tool 100 on an area or construction site 900 with the stationary detector 130 and the rotary laser system 110 mounted on the level platform 118. The rotary laser system 110 generates the rotating laser beam 120, which can be detected by the stationary detector 130. The rotating laser beam 120 comprises a specific inclination angle α, which can, e.g., correspond to a target value for the elevation. Since the stationary detector 130 comprises a row of photocells 138, it can be sensible to height deviations of the rotating laser beam 120 within the detectible height range d. For example, the target value for the elevation can be assigned to the middle point 137 of the detectible height range d, any deviations, above or below the middle point 137, can be detected and hence the height of the working tool 100 can be adjusted appropriately so that the target value for the elevation can be obtained. The working tool 100 and the rotary laser system 110 communicate, for example, with the radio signals 125 and 135. This allows a re-adjustment of the inclination angle α, for example, for the case when the rotating laser beam 120 leaves the detectable range d of the detector 130, the inclination angle α can be changed in time so that the rotating laser beam 120 remains inside the detectable range d.

FIG. 6 gives a schematic view on the algorithm for adjusting the elevation of the working tool 100. The local position 605 of the working tool 100 and the position 610 of the rotary laser system 110 are transmitted via a radio transmission 620. On the basis of the local positions 605 and the position 610 and optionally on the basis of target values for the elevation, an evaluation unit 625 evaluates the inclination angle α for the rotary laser beam 120. The inclination angle for the rotating laser beam 120 can be adjusted by changing the mirror 114 of the rotary laser system 110. The stationary detector 130 detects the rotating laser beam 120 and, depending on the photocell in the row of photocells 138, which detects the rotating laser beam 120, a stationary processing unit 630 evaluates an actual value for the elevation of the working tool 100.

The inclination angle α can be chosen in a way, so that the target value for the elevation corresponds to the middle point 137 or another point along the row of photocells 135. By comparing the actual value with the target value for the elevation of the working tool 100, an adjustment of the working tool 100 can be done (e.g. by hydraulics) in order to reach the target value for the elevation of the working tool 100.

FIG. 7 shows a schematic view for adjusting the inclination angle α of the rotating laser beam 120. An initial value for α (α=0, for example) corresponds to the reference plane 105 and a distance measurement of the stationary detector 130 to the rotary laser system 110 can be performed by time measurements to obtain a delay time between transmitting the signal 135 and receiving the signal 125. If the working tool 100 is moving further in the direction 710, from a certain position 720, the elevation 730 of the working tool 100 deviates from the reference plane 105. Correspondingly, the rotating laser beam 120 will move down along the vertical row of photocells 138. Since the stationary detector 130 or the working tool 100 can transmit its position or the distance to the rotary laser system 110, for example, via the radio signal 135, the rotary laser system 110 can adjust the inclination angle α appropriately in a way, that the rotating laser beam 120 corresponds to a target value of the elevation 730 above the reference plane 105. Any deviations from the target value for the elevation 730 can now be detected by the row of photocells 138 and, hence, the working tool 100 can be adjusted appropriately in order to reach the target value for the elevation 730 above the reference plane 105.

As described at FIG. 4, this can be done by adjusting α so that the target value corresponds to the case, where the laser beam 120 hits the row of photocells 138 at a pre-determined position, e.g. the middle point 137. In the FIG. 7 only a motion along the x axis is considered, but in the same way, also a moving working tool 100 along the y axis or any other directions in the (x,y)-plane can be adjusted in the same way.

In further embodiments, the stationary detector 130 can transmit information about which the photocell of the row of photocells 138, which detects the rotating laser beam 120 to the rotary laser system 110. Now, the inclination angle α can be adjusted by the rotary laser system 110 in a way, that the rotating laser beam 120 hits the row of photocells 138, for example, close to the middle point 137 or another pre-determined point. An evaluation unit, which can, for example, be on the working tool 100 or any other place, can evaluate from the adjusted inclination angle α the actual value of the elevation 730 above the reference plane 105. This information can be transmitted to the working tool 100, e.g. by means of the radio signals 125, and the working tool 100 can be adjusted so that the elevation 730 coincides with the target value. The target value should be obtained from a model for the area (construction site).

FIG. 8 shows geometric quantities, in order to translate the elevation 730 of the working tool 100 above the (x,y)-plane in terms of inclination angles $\alpha_x$ and $\alpha_y$.

Figure 8A:
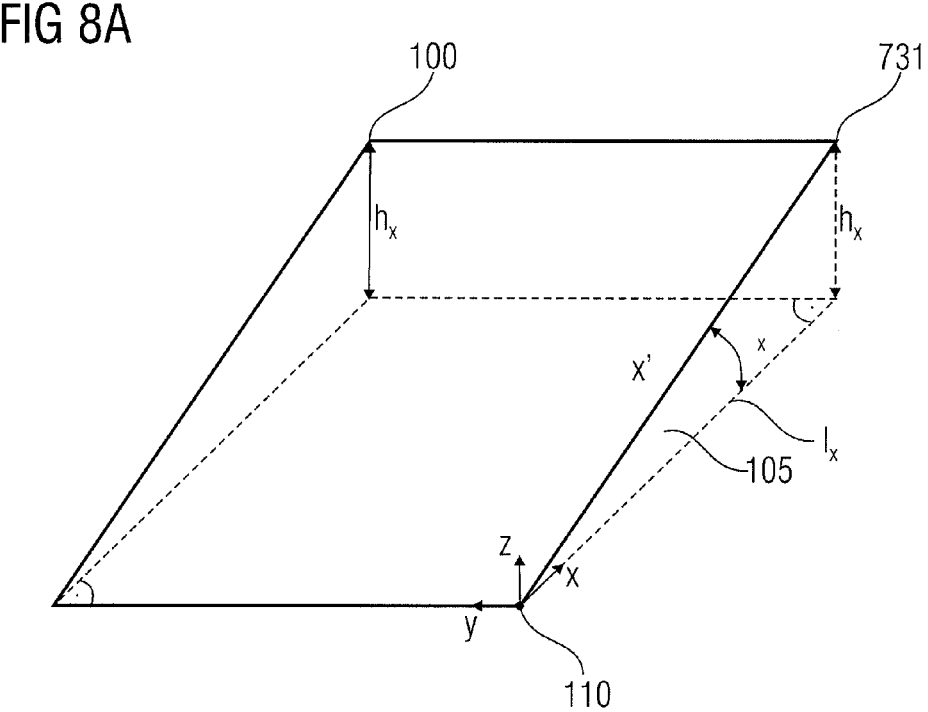
FIG. 8 is a schematic view about geometrical quantities.

In FIG. 8A, the origin of the coordinate system is put at the rotary laser system 110 and the working tool 100 is, for example, positioned at the opposite corner of a rectangle (indicated by dashed lines) in the reference plane 105. In this example, the working tool 100 is elevated only with respect to an inclination about the y-axis. The inclination about the angle $\alpha_x$ yields an inclined (x',y)-plane. The elevation $h_x$ of a first corner point 731 above the reference plane 105 is given in terms of the inclination angle $\alpha_x$ by the relation:

$$\tan\alpha_x \equiv \frac{h_x}{l_x}, \quad (1)$$

wherein $l_x$ denotes the distance of the first corner point 731 from the origin (the rotary laser system 110).

Figure 8B:
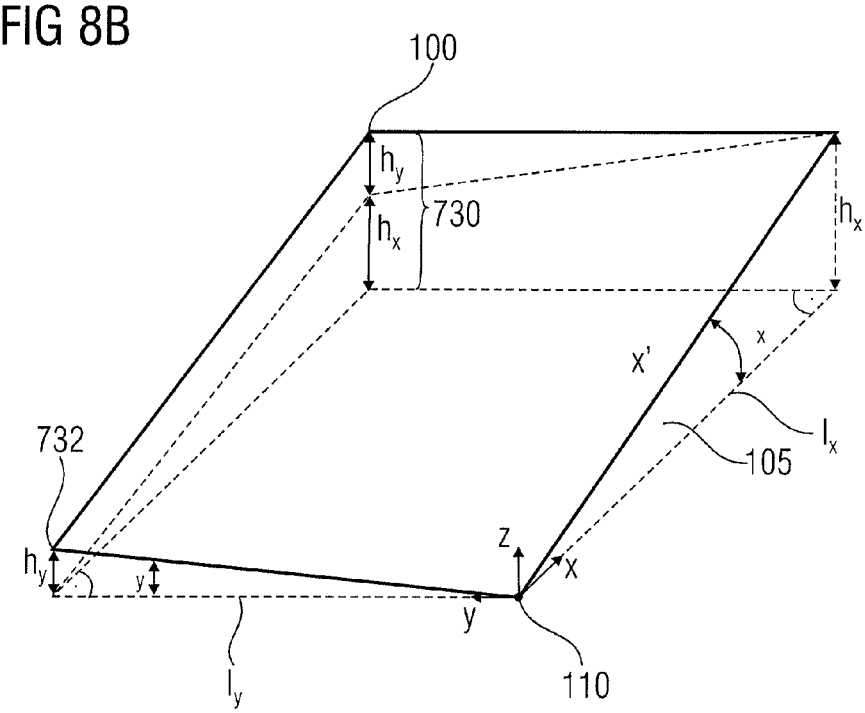

FIG. 8B shows an example where the working tool 100 is, in addition to the inclination about the y-axis, also inclined about an inclination angle $\alpha_y$ around the x-axis. This means, that along the x-axis, a second corner point 732 is elevated above the reference plane 105 by a value of $h_y$, which is related to the inclination angle $\alpha_y$ by the following relation:

$$\tan\alpha_y \equiv \frac{h_y}{l_y}, \quad (2)$$

wherein $l_y$ denotes the distance of the second corner point 732 from the origin (or to the rotary laser system 110).

Hence, the total elevation 730 of the working tool 100 is given by the sum of $h_x$ and $h_y$ and can be related to the inclination angles $\alpha_x$ and $\alpha_y$ by the equation (1) and (2). The aforementioned inclination angle $\alpha$ from the rotary laser system 110 to the working tool 100 can now be evaluated in the following way:

$$\tan\alpha \equiv \frac{h_x + h_y}{\sqrt{(l_x)^2 + (l_y)^2}} \quad (3)$$

The inclination angles $\alpha_x$ and $\alpha_y$ can be adjusted by the rotary laser system 110 by inclining the mirror around the y-axis by the $\alpha_x$ inclination angle and about the x-axis by the $\alpha_y$ inclination angle.

Figure 9:
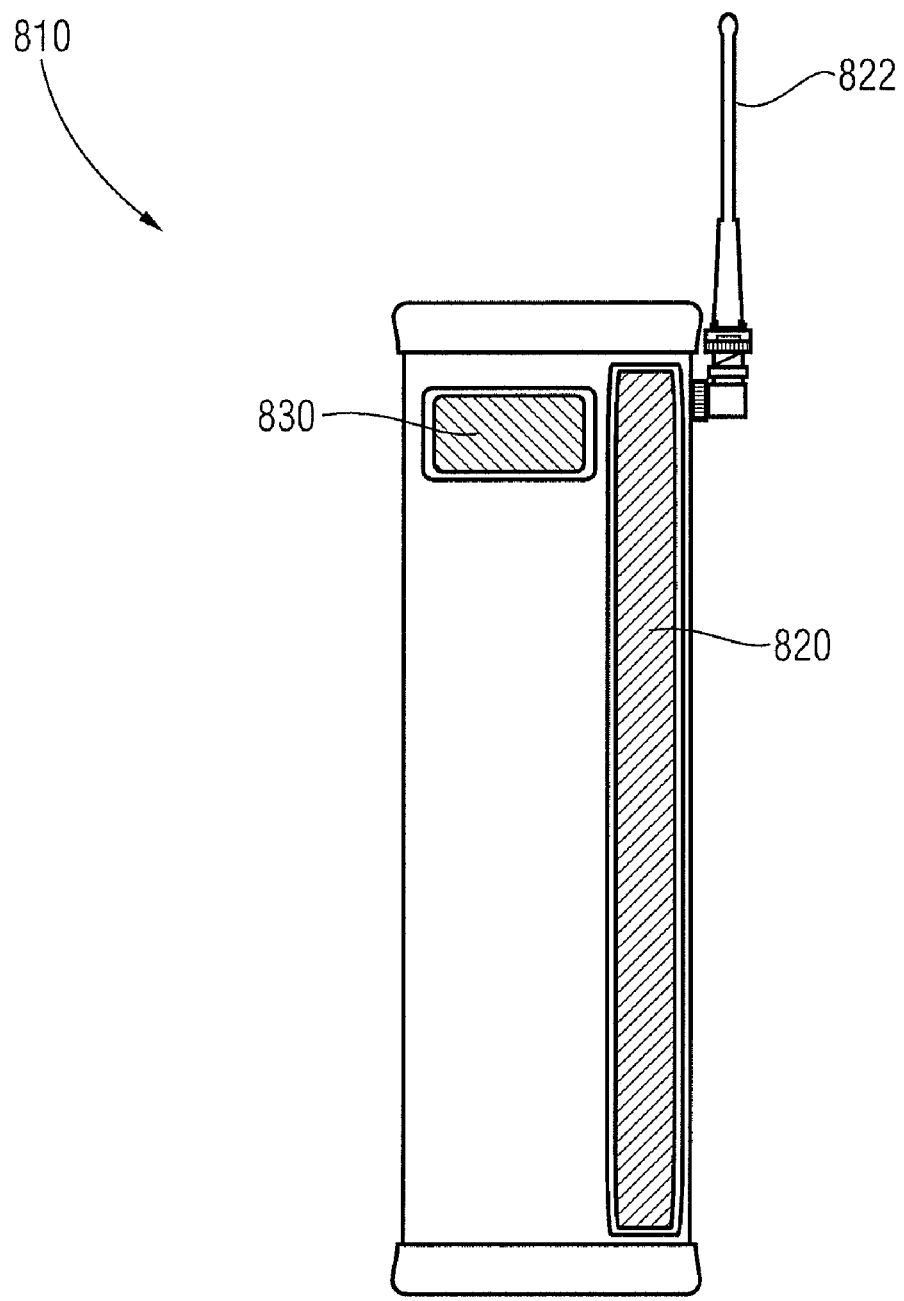
FIG. 9 shows a further detector.

FIG. 9 shows a further detector 810 comprising a further row of photocells 820, which can comprise, for example, an optional optic to focus the pulses from the rotating laser beam 120 on the photocells. The further detector 810 includes furthermore the radio antenna 822 connected to a radio unit (not shown in the figure) and a display 830. In an optional embodiment this further detector 810 is not stationary, but is instead mobile or a hand-held device and can be used to survey the working area or define in addition to the rotary laser system 110 another reference point and use it for an additional position evaluation. This will be explained in more detail in the following.

Figure 10:
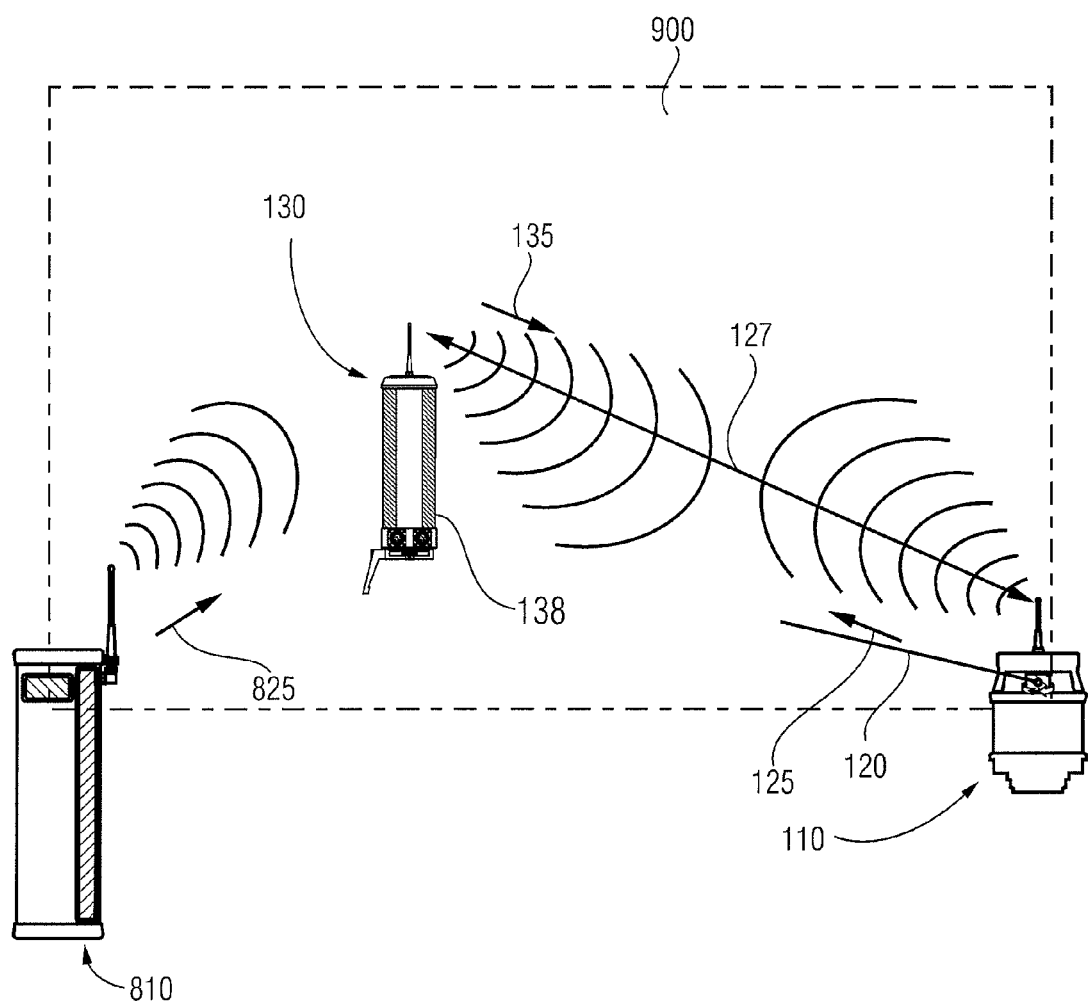
FIG. 10 shows a top view on a working area with the rotary laser system and the further detector at two corners.

FIG. 10 shows an exemplary use of the further detector 810. The rotary laser system 110 and the further detector 810 are positioned at two corners of an area 900, within which the stationary detector 130 is located. In this embodiment the further detector 810 transmits a radio signal 825 in the moment the further detector 810 detects the rotating laser beam 120. The radio signal 825 is received by the stationary detector 130, which initiates a measurement of the distance 127 to the rotary laser system 110, for example, by transmitting the radio signal 135 and measuring the elapsed time until the return radio signal 125 is received. This distance measurement is the same as the one discussed in the context of FIG. 1. The difference here, it is initiated by the radio signal 825 and not by the laser pulses as in the embodiment discussed in the context of FIG. 1.

In addition to the measurement the distance 127, the stationary detector 130 can measures a time duration T between the receipt of the radio signal 825 and the moment the rotating laser beam 120 is detected by the array of photocells 138. Again, since the angular velocity $\omega$ of the rotating laser beam 120 can be constant and is known, an angle $\psi$ between the two lines connecting the rotary laser system 110 with the further detector 810 and the line of the rotary laser system 110 to the stationary detector 130 can be evaluated (see next formula). In each revolution of the rotary laser system 110, the laser beam 120 hits normally the detectors 130, 810 and in an optional embodiment only some of the hits of the laser beam 120 in a given time period are used to trigger distance measurements (e.g. in order to avoid a data overload).

Figure 11:
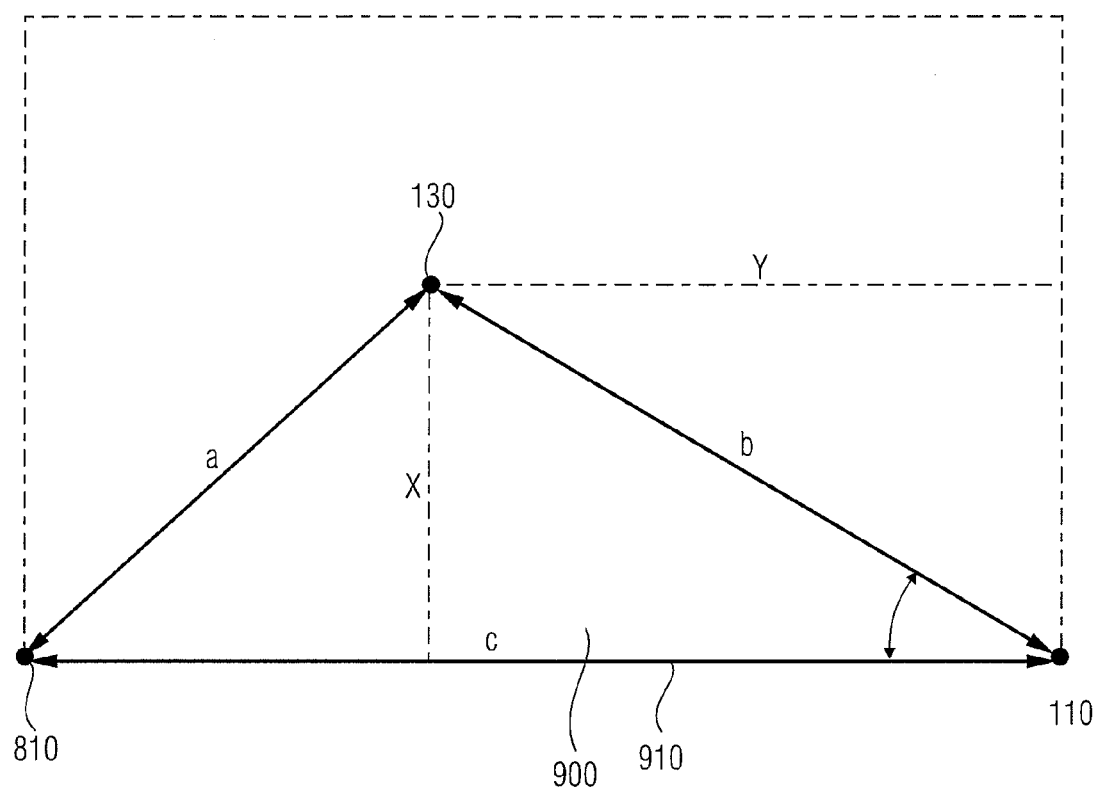
FIG. 11 is a further schematic view about geometrical quantities for the embodiment of FIG. 10.

FIG. 11 shows geometric quantities, which are used for an evaluation of a position of the stationary detector 130 within the area 900. As in the embodiment of FIG. 10, the rotary laser system 110 and the further detector 810 are at two corners of the area 900 and the stationary detector 130 can be within the area 900. By using the time duration T and the (constant) angular velocity $\omega$, the angle $\Psi$ is given by:

$$\psi = \omega T. \quad (4)$$

The distance 127 is denoted in FIG. 11 by "b" and hence the relative coordinates X and Y can be obtained from "b" and the angle $\psi$ by $$X = b\sin\psi,\ Y = b\cos\psi. \quad (5)$$

In a different embodiment, the measurement of the distance 127 can be initiated by the rotary laser system 110, namely by sending the radio signal 125 when the rotating laser beam passes 120 a zero reference mark 910 (e.g. $\psi=0$). At the time the stationary detector 130 receives the radio signal 125, it transmits the radio signal 135 and the rotary laser system 110 evaluates from the elapsed time between transmitting the radio signal 125 and receiving the radio signal 135 the distance 127, which is again denoted by "b" in FIG. 11. At the same time, the stationary detector 130 measures the time duration T between receiving the radio signal 125 and detecting the rotating laser beam 120 and evaluates again the angle $\psi$ and therewith the relative coordinates x and y in terms of the formulae given before. In this embodiment no further detector 810 is needed, but instead a known zero reference mark 910 can be used. The zero reference mark 910 can agree with line from the rotary laser system 110 and the further detector 810, but it may also be another line.

In a further embodiment, the coordinates x and y are evaluated not by measuring the angle $\Psi$, but instead by determining site lengths of a triangle spanned by the rotary laser system 110, the further detector 810 and the stationary detector 130. As discussed at FIG. 10, at the time the rotating laser beam 120 is detected by the further detector 810 (or at another time), the further detector 810 transmits the radio signal 825, which in turn initiate the measurement of the distance 127, which is denoted by "b" in FIG. 10, between the stationary detector 130 and the rotary laser system 110. This is done here in the same way as discussed in the FIG. 10. In addition, the further detector 810 measures elapsed time periods between transmitting the radio signal 825 and receiving the radio signal 135 and the radio signal 125. Since the radio signals 825, 135 and 125 are transmitted in all directions, the further detector 810 is able to receive the radio signals 135 and 125 as well. From the elapsed time periods the further detector 810 evaluates the distances between the further detector 810 and the stationary detector 130, which denoted by "a" in FIG. 11, and to the rotary laser system 110, which is denoted by "c" in FIG. 11. Having the values for "a", "b", "c" the relative coordinates x and y are obtained from:

$$X = \sqrt{b^2 - Y^2}, \quad (6)$$
$$y = \frac{b^2 + c^2 - a^2}{2c}.$$

If moreover a global position of the rotary laser system 110 or the further detector 810 is known, with the relative coordinates X and Y, the global position of the stationary detector 130 can be evaluated too.

In further embodiments, an optional further stationary detector and/or an additional further detector are used to determine an elevation of other working tools 100 and/or to determine relative coordinates to other reference points at the same time. This is especially possible if the reference plane 105 is planar so that there is no need to adjust the inclination angle $\alpha$ dependent on the position of working tools. In an embodiment each component (e.g. the rotary laser system 110, the stationary detector 130 and the further detector 810) can use cadable radio modules so that each component can clearly be identified by its transmitted coded radio signal.

Advantages of embodiments of the present invention comprise the improved reliability, because it neither uses the GPS signal nor a strobe pulse for synchronization. The employed technology is simple, reliable and available at low costs. Especially radio transponders are very fast and accurate. In addition, only one transmitter is needed and an optional handheld detector 810 can be used to survey the working area and to define together with the laser transmitter a reference line. It is furthermore beneficial that the present invention allows combining the elevation control with a local (relative) position control in the reference plane 105.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for determining an elevation of a working tool relative to a reference plane, comprising:
    a rotary laser system emitting a rotating laser beam that spans upon rotation a plane inclined relative to the reference plane by an inclination angle, the rotary laser system comprising a first radio unit;
    a detector mounted on the working tool for detecting the laser beam, the detector comprising a second radio unit,
    wherein the detector is adapted to initiate a distance measurement to determine the distance between the working tool and the rotary laser system when the detector is hit by the rotary laser beam;
    wherein during the distance measurement
        the detector is adapted to control the second radio unit to transmit a radio signal,
        the rotary laser system is adapted to control the first radio unit to transmit a return radio signal in response to receiving the radio signal from the detector, and
        the detector is adapted to receive the return radio signal from the rotary laser system, to measure an elapsed time between the transmission of the radio signal and reception of the return radio signal, and to determine the distance between the working tool and the rotary laser system on the basis of the elapsed time,
    wherein the detector is adapted to determine the elevation of the working tool on the basis of the inclination angle and the determined distance between the working tool and the rotary laser system.

2. The apparatus according to claim 1, wherein the rotary laser system is adapted to be inclined for adjusting the inclination angle with respect to two rotational axes in the reference plane.

3. The apparatus according to claim 2, wherein the rotary laser system comprises a mirror, which is rotatable with respect to the two axes in the reference plane.

4. The apparatus according to claim 1, wherein the detector comprises a vertical row of photocells, wherein different photocells in the vertical row are arranged to detect the rotating laser beam for different inclination angles.

5. The apparatus according to claim 4, wherein the detector comprises a further vertical row of photocells, wherein the vertical row of photocells and the further vertical row of photocells are arranged to detect the rotating laser beam hitting the detector from different directions.

6. The apparatus according to claim 1, wherein, for determining a position of the working tool,
    the first radio unit is adapted to measure the distance between the detector and the rotary laser system when the rotating laser beam passes a zero-reference mark,
    the detector is adapted to measure a time period from the passing of the zero-reference mark to the detection of the rotating laser beam by the detector, and
    the apparatus is adapted to determine a position of the working tool on a basis of the distance and the time period.

7. The apparatus according to claim 1, further comprising:
    a further detector for detecting the rotating laser beam, the further detector comprising a further radio unit, the further radio unit being adapted to measure a further distance,
    wherein the further detector is located at a reference point and is adapted to determine an elevation of the reference point over the reference plane on the basis of the inclination angle and the further distance.

8. The apparatus according to claim 7, wherein, for determining a position of the working tool,
    the further detector is adapted to transmit a radio signal after detecting the rotating laser beam,
    the detector is configured to receive the radio signal and to measure a time period between receiving the radio signal and detecting the rotating laser beams, and
    the apparatus is adapted to determine a position of the working tool on a basis of the further time period and the distance.

9. The apparatus according to claim 7, wherein
    the radio unit is adapted to measure the distance between the rotary laser system and the detector on the working tool, and
    the further radio unit is adapted to measure both the distance between the rotary laser system and the further detector and the distance between the detector and the further detector,
    when the rotating laser beams pass the zero reference mark or when the further detector detects the rotating laser beams.

10. The apparatus according to claim 6, comprising:
    a processing unit, which is adapted to determine the elevation of the working tool or the position of the working tool relative to the rotary laser system on the basis the distance measurements, the inclination angle or the time period or the further time period.

11. The apparatus according to claim 10, wherein the rotary laser system is adapted to transmit the inclination angle to the processing unit.

12. The apparatus according to claim 1, wherein the rotary laser system is adapted to change the inclination angle while transmitting the rotating laser beam.

13. The apparatus according to claim 1, wherein the rotary laser system is adapted to change the inclination angle $\alpha$ as a response of receiving information about a position of the working tool or a position of the detector.

14. The apparatus according to claim 6, wherein the radio unit and the further radio unit are adapted to use a coded radio signal for identification of a transmitting unit.

15. A method for determining an elevation of a working tool to a reference plane, comprising:
    emitting by a rotary laser system a rotating laser beam that spans upon rotation a plane inclined relative to the reference plane by an inclination angle, the rotary laser system comprising a first radio unit;
    detecting the laser beam by a detector mounted on the working tool, the detector comprising a second radio unit, wherein the detector initiates a distance measurement to determine the distance between the working tool and the rotary laser system when the detector is hit by the rotary laser beam;

wherein the distance measurement comprises
transmitting a radio signal by the second radio unit,
transmitting a return radio signal by the first radio unit in response to receiving the radio signal from the detector, and
receiving at the detector the return radio signal from the rotary laser system, measuring an elapsed time between the transmission of the radio signal and reception of the return radio signal, and determining the distance between the working tool and the rotary laser system on the basis of the elapsed time;
determining the elevation of the working tool on the basis of the inclination angle and the determined distance between the working tool and the rotary laser system.

16. The method according to claim 15, wherein the detector on the working tool comprises a row of photocells, further comprising:
transmitting a position of the photocell along the row of photo cells, which has detected the rotating laser beam, to the rotary laser system; and
changing the inclination angle so that the rotating laser beam hits a photocell at a predetermined position along the row of photocells.

17. The method according to claim 15, further comprising:
transmitting the inclination angle from the rotary laser system to the working tool; and
changing the elevation of the working tool until a target value of the elevation of the working tool is reached.

18. The method according to claim 15, wherein the detector comprises a row of photocells, further comprising:
changing an elevation of the working tool in accordance to a position of a photocell of the row of photocells, which detects the rotating laser beam.

19. The method according to claim 18, wherein the changing of the elevation of the working tool is performed until the elevation of the working tool coincides with a predetermined target value for the elevation of the working tool.

20. The method according to claim 15, further comprising:
measuring a time period between the rotating laser beams passing a zero reference mark and the detector detecting the rotating laser beams to determine a position of the working tool.

21. The method according to claim 15, further comprising:
measuring a further time period between the rotating laser beams passing a further detector and the detector detecting the rotating laser beams in order to evaluate the position of the working tool.

22. The method according to claim 21, further comprising:
measuring of distances between the rotary laser system and the detector on the working tool, between the detector and the further detector and between the further detector and the rotary laser system simultaneously in order to determine the position of the working tool.

* * * * *